United States Patent [19]
Schleck et al.

[11] Patent Number: 5,281,367
[45] Date of Patent: Jan. 25, 1994

[54] TWO-COMPONENT CHEMILUMINESCENT COMPOSITION

[75] Inventors: James R. Schleck, Somerset; George J. Keyko, Westfield; Vilas M. Chopdekar, Edison, all of N.J.

[73] Assignee: Jame Fine Chemicals, Inc., Bound Brook, N.J.

[21] Appl. No.: 83,666

[22] Filed: Jun. 28, 1993

[51] Int. Cl.$^5$ .............................................. C09K 3/00
[52] U.S. Cl. ................................................ 252/700
[58] Field of Search ................... 252/582, 700, 600; 362/34

[56] References Cited

U.S. PATENT DOCUMENTS

| | | | |
|---|---|---|---|
| 3,597,362 | 8/1971 | Bollyky et al. | 252/186 |
| 3,749,679 | 7/1973 | Raubut | 252/188.3 |
| 3,775,336 | 11/1973 | Bollyky | 252/188.3 |
| 3,816,326 | 6/1974 | Bollyky | 252/700 |
| 4,076,645 | 2/1978 | Vega | 252/700 |
| 4,626,383 | 12/1986 | Richter et al. | 252/700 |
| 4,655,969 | 4/1987 | Richter et al. | 252/700 |
| 4,717,511 | 1/1988 | Koroscil | 252/700 |
| 4,751,616 | 6/1988 | Smithey | 362/34 |
| 4,784,803 | 11/1988 | Borsotti | 252/700 |
| 5,122,306 | 6/1992 | Van Moer et al. | 252/700 |
| 5,232,635 | 8/1993 | Van Moer et al. | 252/700 |

Primary Examiner—Philip Tucker
Attorney, Agent, or Firm—Jack Matalon

[57] ABSTRACT

A two component chemiluminescent composition comprising an oxalate component and a peroxide component together with a fluorescer and a catalyst which comprises a magnesium salt of salicylic acid or a substituted salicylic acid such as magnesium salicylate, magnesium-3,5,6-trichlorosalicylate, magnesium-3,5-dichloro-salicylate or magnesium-3-chlorosalicylate. High intensity chemiluminescent light of long duration is instantly produced when the two components are mixed.

13 Claims, No Drawings

TWO-COMPONENT CHEMILUMINESCENT COMPOSITION

FIELD OF THE INVENTION

The invention relates to a catalyst for a two-component chemiluminescent composition which, upon admixture of the two components, instantly produces high intensity chemiluminescent light of ion duration.

BACKGROUND OF THE INVENTION

Chemiluminescent compositions which produce light upon admixture of two components are well known. The two components are kept separate until light is desired. At the desired time, the two components are mixed and light is produced. The intensity, duration and color of the light will depend on the ingredients of the two components.

The first component is an oxalate component which comprises an oxalate ester and a solvent. The second component is a peroxide component which comprises a peroxide compound and a solvent. The composition also includes a fluorescer, which may be present in either component as well as a catalyst which is normally present in the peroxide component.

The prior art discloses the use of Group Ia metal salts as catalysts for the chemiluminescent compositions. Examples of such prior art catalysts include sodium salicylate, sodium-5-halogen salicylates, rubidium acetate, lithium salicylate, lithium-5-t-butyl salicylate, lithium mono-, di- and tri- chloro-salicylates, rubidium acetate, potassium salicylate, tetraalkylammonium salicylates, tetraalkylammonium benzoates, perchlorates, fluoborates, benzoates and the like, see U.S. Pat. Nos. 3,775,336; 3,749,679, 4,751,616, 4,626,383, and the like.

The prior art catalysts mentioned above suffer from several disadvantages, e.g. The are too "hot", i.e. they produce chemiluminescent light of high intensity but of short duration, the light is of long duration but of low intensity, light of acceptable intensity and duration is produced only at room temperatures or higher, etc. In contradistinction thereto, the catalysts of the present invention readily produce chemiluminescent light of high intensity and long duration at cold temperatures, e.g. as low as $-40°$ C.

DETAILS OF THE INVENTION

The present invention pertains to a two-component chemiluminescent composition comprising:
(a) an oxalate component comprising an oxalate ester and a solvent;
(b) a peroxide component comprising a peroxide compound and a solvent;
(c) a fluorescent contained in the oxalate component and/or the peroxide component; and
(d) a catalyst contained in the peroxide component, said catalyst comprising a magnesium salt of salicylic acid or a substituted salicylic acid.

THE OXALATE COMPONENT

The oxalate component comprises a solution of an oxalate ester in an organic solvent. Suitable oxalate esters and processes for their preparation are well known in the prior art, e.g. see U.S. Pat. Nos. 3,597,362 and 3,749,679. Examples of suitable oxalate esters include bis(2,4,5-trichloro-6-carbopentoxyphenyl)oxalate (commonly referred to as "CPPO"); bis(2,4,5-trichlorophenyl)oxalate (commonly referred to as "TCPO"); bis(2,4,5-tribromo-6-carbohexoxyphenyl)oxalate; bis(2-nitrophenyl)oxalate; bis(2,4-dinitrophenyl)oxalate; bis(2,6-dichloro-4-nitrophenyl)oxalate; bis(2,4,6-trichlorophenyl)oxalate, bis(3-trifluoromethyl-4-nitrophenyl)oxalate, bis(2-methyl-4,6-dinitrophenyl)oxalate, bis(1,2-dimethyl-4,6-dinitrophenyl)oxalate, bis(2,4-dichlorophenyl)oxalate, bis(2,5-dinitrophenyl)oxalate, bis(2-formyl-4-nitrophenyl)oxalate, bis(pentachlorophenyl)oxalate, bis(1,2-dihydro-2-oxo-1-pyridyl)-glyoxal, bis-N-phthalimidyl oxalate, etc. Preferably, the oxalate ester comprises CPPO or TCPO.

The oxalate ester is typically present in a concentration of about 0.01 to 1.5 M, preferably 0.03 to 0.3 M, in a suitable organic solvent, i.e. a solvent which does not readily react with the oxalate ester. Such solvents include esters such as ethyl acetate, ethyl benzoate, dimethyl phthalate, dibutyl phthalate, dioctyl phthalate, methyl formate, triacetin, diethyl oxalate, dioctyl terephthalate, and the like; aromatic hydro-carbons such as benzene, toluene, ethylbenzene and butylbenzene, and the like; and chlorinated hydrocarbons such as chlorobenzene, o-dichlorobenzene, m-dichloro-benzene, chloroform, carbon tetrachloride, hexachloro-ethane, tetrachlorotetrafluoropropane, and the like. The preferred solvent for the oxalate ester comprises dibutylphthalate.

THE PEROXIDE COMPONENT

The peroxide component comprises a solution of a peroxide compound in an organic solvent. Suitable peroxide compounds include hydrogen peroxide (which is preferred), sodium peroxide, sodium perborate, urea peroxide, sodium pyrophosphate peroxide, histidine peroxide, t-butylhydroperoxide, peroxybenzoic acid, and the like.

The peroxide compound is typically present in a concentration of about 0.01 to 3 M, preferably 0.10 to 2.0 M, in an organic solvent which does not readily react with the peroxide compound.

Solvents useful for dissolving the peroxide compound include alcohols such as t-butyl alcohol, ethanol, n-octanol, 3-methyl-3-pentanol, 3,6-dimethyloctanol-3, and the like; esters such as ethyl acetate, ethyl benzoate, dimethylphthalate, dibutylphthalate, propyl formate, and the like; ethers such as diethyl ether, diamyl ether, tetrahydrofuran, dioxane, dibutyl-diethyleneglycol, perfluoropropyl ether, 1,2-dimethoxy-ethane, and the like. The preferred solvent for the peroxide compound comprises a mixture of dimethyl-phthalate and t-butyl alcohol.

THE FLUORESCENT

The fluorescer will typically be a compound which has a spectral emission in the range of 330 to 1,000 m$\mu$ and which will be soluble in the solvents mentioned above. The fluorescer may be present in the oxalate component, the peroxide component or in both components and is typically present in a concentration of 0.002 to 0.03 M, preferably 0.001 to 0.005 M.

Suitable fluorescers include those described in U.S. Pat. Nos. 3,729,426, 3,948,797, 4,017,415 and 5,122,306 such as 9,10-bis(phenylethynyl)anthracene, 9,10-bis (4-methoxyphenyl)-2-chloroanthracene, monochloro-substituted 9,10-bis (phenylethynyl)anthracenes such as 1-chloro-9,10-bis(phenylethynyl)anthracene, dichloro-substituted 9,10-bis(phenylethynyl)anthracenes such as 1,8-dichloro-9,10-bis(phenylethynyl)anthracene, 1,5-dichloro-9,10-bis (phenylethynyl)anthracene, 2,3- dichloro-9,10-bis (phenylethynyl)anthracene, 5,12-bis(phenylethynyl)tetracene, 9,10-diphenylanthracene, perylene, 1,6,7,12-tetraphenoxy-N,N'-bis(2,6-diisopropylphenyl)-3,4,9,10-perylene dicarboximide, 1,6,7,12-tetraphenoxy-N,N'-bis(2,5-di-t-butylphenyl)-3,4,9,10-perylene dicarboximide, 1,7-dichloro-6, 12-diphenoxy-N,N'-bis(2,6-diisopropyl-phenyl)-3,4,9,10-perylene dicarboximide, 1,6,7,12-tetra(p-bromophenoxy)-N,N'-bis(2,6-diisopropylphenyl)-3,4,9,10-perylene 3,4,9,10-perylene dicarboximide, 1,6,7,12-tetra(p-t-butylphenoxy)-N,N,-dineopentyl-3,4,9,10-perylene dicarboximide, 1,6,7,12-tetra(o-chlorophenoxy)-N,N'-bis (2,6-diisopropylphenyl)-3,4,9,10-perylene dicarboximide, 1,6,7,12-tetra(p-chlorophenoxy)-N,N'-bis (2,6-diisopropylphenyl)-3,4,9,10-perylene dicarboximide, 1,6,7,12-tetra(p-fluorophenoxy)-N,N'-bis (2,6-diisopropylphenyl)-3,4,9,10-perylene dicarboximide, 1,6,7,12-tetra(p-fluorophenoxy)-N,N'-bis (2,6-diisopropylphenyl)-3,4,9,10-perylene dicarboximide, 1,6,7,12-tetraphenoxy-N,N'-diethyl-3,4,9,10-perylene dicarboximide, 1,7-dibromo-6,12-diphenoxy-N,N'-bis(2-isopropylphenyl)-3,4,9,10-perylene dicarboximide, 16,17-dihexyloxyviolanthrone, rubrene, and the like. The total fluorescer concentration (i.e. in the oxalate component and/or in the peroxide component) will typically be in the range of 0.002 to 0.03 M, preferably 0.001 to 0.005 M.

THE CATALYST

The catalyst is contained in the oxalate component and comprises a magnesium salt of salicylic acid or a substituted salicylic acid. Suitable salts include magnesium salicylate, magnesium-5-t-butyl salicylate, magnesium-3,5,6-trichlorosalicylate, magnesium-3,5-dichlorosalicylate and magnesium-3-chlorosalicylate. Preferably, the catalyst comprises magnesium salicylate. The catalyst is generally utilized in a concentration of $1 \times 10^{-6}$ to $1 \times 10^{-1}$ M, preferably $1 \times 10^{-3}$ to $1 \times 10^{-2}$ M The ingredients of the oxalate component as well as those of the peroxide component are admixed, typically for 1 to 15 minutes, to form the respective components. Chemiluminescent light is produced by admixing (or shaking) the oxalate component with the peroxide component at a temperature in the range of $-40°$ C. to $75°$ C., preferably $-10°$ C. to $50°$ C. Typically, 1-3 parts by volume of the oxalate component are admixed with each part of the peroxide component.

The following examples are intended to illustrate the present invention and are in no way intended to limit the invention except as limited in the appended claims.

EXAMPLE 1—PEROXIDE COMPONENT WITH MAGNESIUM SALICYLATE

Into a 3-liter flask equipped with stirrer were added 1600g dimethyl phthalate, 280g t-butyl alcohol, 1.24 m/l hydrogen peroxide and $1.125 \times 10^{-3}$ mole magnesium salicylate. The ingredients were stirred for 5 minutes to obtain a clear solution. Thereafter, an additional amount of $1.125 \times 10^{-3}$ mole magnesium salicylate was added and stirring continued for an additional 15 minutes. The concentration of the magnesium salicylate was thus $1.125 \times 10^{-3}$ m/l.

EXAMPLE 2—PEROXIDE COMPONENT WITH LITHIUM SALICYLATE

Example 1 was repeated using equivalent molar amounts of lithium salicylate instead of magnesium salicylate. The concentration of the lithium salicylate in the peroxide component was $1.125 \times 10^{-3}$ m/l.

EXAMPLE 3—PEROXIDE COMPONENT WIHT SODIUM SALICYLATE

Example 1 was repeated using equivalent molar amounts of sodium salicylate instead of magnesium salicylate. The concentration of the sodium salicylate in the peroxide component was $1.125 \times 10^{-3}$ m/l.

EXAMPLE 4—OXALATE COMPONENT WITH CPPO AND FLUORESCER

CPPO, e.e. bis(2,4,5-trichloro-6-carbopentoxyphenyl) oxalate, was synthesized as set forth in U.S. Pat. No. 3,749,679. 90g CPPO and 1.1g of a fluorescer comprising 9,10-bis(phenylethynyl)anthracene were added to dibutyl-phthalate so as to obtain 1 liter of oxalate component. This oxalate component was utilized for producing chemiluminescent light throughout the comparisons set forth in Example 5 below.

EXAMPLE 5—COMPARISONS OF MG, LI AND NA SALICYLATES

In this example, 12 ml of the oxalate component of Example 4 were placed in each test tube and 4 ml of each peroxide component of Examples 1-3 were added to each test tube which was then vigorously shaken (at room temperature) for several seconds. The chemiluminescent light glow was then observed over the time intervals indicated in Table I below. ("VSG"=very strong glow; "SG"=strong glow; "MG"=moderate glow; "WG"=weak glow; "NG"=no glow)

TABLE I

| | Chemiluminescent Light Glow (CPPO) | | |
|---|---|---|---|
| Time | Ex. 1 | Ex. 2 | Ex. 3 |
| 30 seconds | VSG | VSG | VSG |
| 5 minutes | VSG | VSG | SG |
| 10 minutes | VSG | SG | SG |
| 12 minutes | SG | SG | SG |
| 8 hours | SG | SG | SG |
| 12 hours | MG | MG | MG |
| 22 hours | MG | MG | NG |
| 36 hours | WG | WG | NG |
| 48 hours | WG | NG | NG |

The results set forth in Table I show that magnesium salicylate provides superior results as a catalyst in comparison to both lithium and sodium salicylate.

EXAMPLE 6—OXALATE COMPONENT WITH TCPO AND FLUORESCER

Example 4 was repeated using TCPO, i.e. bis(2,4,5-trichlorophenyl)oxalate, instead of CPPO.

EXAMPLE 7—COMPARISONS OF MG AND NA SALICYLATES

In this Example, comparisons were made using the peroxide components of Example 1 (magnesium salicylate) and Example 3 (sodium salicylate). 12 ml of the oxalate component of Example 6 (TCPO) were placed in each test tube and 4 ml of each peroxide component of Examples 1 and 3 were added to each test tube which was then vigorously shaken (at room temperature) for several seconds. The chemiluminescent light glow was then observed over the time intervals indicated in Table II. ("VSG"=very strong glow; "SG"=strong glow; "MG"=moderate glow; "VWG"=very weak glow)

TABLE II

| Chemiluminescent Light Glow (TCPO) | | |
|---|---|---|
| Time | Mg Sal | Na Sal |
| 30 seconds | VSG | VSG |
| 5 minutes | VSG | SG |
| 10 minutes | VSG | SG |
| 2 hours | MG | MG |
| 8 hours | WG | VWG |

The results set forth in Table II show that magnesium salicylate provides superior results in comparison to sodium salicylate when the oxalate component contains TCPO instead of CPPO.

EXAMPLE 8—COMPARISON OF MG, LI AND NA CHLOROSALICYLATES

The procedures and quantities set forth in Examples 1-5 were repeated, except that magnesium-3,5-dichloro-salicylate ("Mg DiCl Sal") and magnesium-3,5,6-trichloro-salicylate ("Mg TriCl Sal") were used instead of magnesium salicylate, lithium-3,5,6-trichlorosalicylate ("Li TriCl Sal") was used instead of lithium salicylate and sodium-3,5,6-trichlorosalicylate ("Na TriCl Sal") was used instead of sodium salicylate. The results are shown in Table III ("SG"=strong glow, "MG"=moderate glow, "WG"=weak glow, "VWG"=very weak glow, "NG"=no glow)

TABLE III

| | Chemiluminescent Light Glow (CPPO) | | | |
|---|---|---|---|---|
| Time | Mg DiCl Sal | Mg TriCl Sal | Li TriCl Sal | Na TriCl Sal |
| 30 seconds | SG | SG | SG | SG |
| 5 minutes | SG | SG | SG | SG |
| 10 minutes | SG | SG | SG | SG |
| 8 hours | SG | SG | SG | SG |
| 12 hours | MG | MG | MG | MG |
| 18 hours | MG | MG | MG | MG |
| 22 hours | WG | WG | WG | WG |
| 24 hours | WG | WG | WG | WG |
| 36 hours | WG | WG | VWG | VWG |
| 48 hours | VWG | VWG | NG | NG |

The results set forth in Table III show that the chlorinated analogs of magnesium salicylate are also quite useful catalysts for producing chemiluminescent light and further that such chlorinated analogs are superior to the chlorinated analogs of lithium and sodium salicylate.

What is claimed is:

1. A two-component chemiluminescent composition comprising:
   (a) an oxalate component comprising an oxalate ester and a solvent;
   (b) a peroxide component comprising a peroxide compound and a solvent;
   (c) a fluorescer contained in the oxalate component and/or the peroxide component;
   (d) a catalyst contained in the peroxide component, said catalyst being selected from the group consisting of magnesium salicylate, magnesium-3,5,6-trichlorosalicylate, magnesium 3,5-dichloro-salicylate and magnesium-3-chlorosalicylate.

2. The composition of claim 1 wherein the catalyst comprises magnesium salicylate.

3. The composition of claim 1 wherein the catalyst is present in a concentration of $1 \times 10^{-6}$ to $1 \times 10^{-1}$ M.

4. The composition of claim 1 wherein the oxalate ester comprises bis(2,4,5-trichloro-6-carbopentoxyphenyl) oxalate.

5. The composition of claim 1 wherein the oxalate ester comprises bis(2,4,5-trichlorophenyl) oxalate.

6. The composition of claim 1 wherein the exolate ester is present in a concentration of 0.01 to 1.5 M.

7. The composition of claim 1 wherein the peroxide component comprises hydrogen peroxide.

8. The composition of claim 1 wherein the peroxide component is present in a concentration of 0.01 to 3 M.

9. The composition of claim 1 wherein the fluorescer is present in the oxalate component.

10. The composition of claim 1 wherein the fluorescer comprises a compound selected from the group consisting of 9,10-bis(phenylethynyl)anthracene, 9,10-bis(4-methoxyphenyl)-2-chloroanthracene, 1-chloro-9,10-bis(phenylethynyl)anthracene, 1,8-dichloro-9,10-bis(phenylethynyl)anthracene, 1,5-dichloro-9,10-bis(phenylethynyl)anthracene, 2,3-dichloro-9,10-bis(phenylethynyl)anthracene, 5,12-bis(phenylethynyl)tetracene, 9,10-diphenylanthracene, perylene, 1,6,7,12-tetraphenoxy-N,N'-bis(2,6-diisopropylphenyl)-3,4,9,10-perylene dicarboximide, 1,6,7,12-tetraphenoxy-N,N'-bis(2,5-di-t-butylphenyl)-3,4,9,10-perylene dicarboximide, 1,7-dichloro-6,12-diphenoxy-N,N'-bis(2,6-diisopropylphenyl)-3,4,9,10-perylene dicarboximide, 1,6,7,12-tetra(p-bromophenoxy)-N,N'-bis(2,6-diisopropylphenyl)-3,4,9,10-perylene dicarboximide, 1,6,7,12-tetraphenoxy-N,N'-dineopentyl-3,4,9,10-perylene dicarboximide, 1,6,7,12-tetra(p-t-butylphenoxy)-N,N'-dineopentyl-3,4,9,10-perylene dicarboximide, 1,6,7,12-tetra (o-chlorophenoxy)-N,N'-bis(2,6-diisopropylphenyl)-3,4,9,10-perylene dicarboximide, 1,6,7,12-tetra (o-chlorophenoxy)-N,N'-bis(2,6-diisopropylphenyl)-3,4,9,10-perylene dicarboximide, 1,6,7,12-tetra(o-fluorophenoxy)-N,N'-bis(2,6-diisopropylphenyl)-3,4,9,10-perylene dicarboximide, 1,6,7,12-tetra(p-fluorophenoxy)-N,N'-bis(2,6-diisopropylphenyl)-3,4,9,10-perylene dicarboximide, 1,6,7,12-tetraphenoxy-N,N,-diethyl-3,4,9,10-perylene dicarboximide, 1,7-dibromo-6,12-diphenoxy-N,N'-bis(2-isopropylphenyl)-3,4,9,10-perylene dicarboximide, 16,17-dihexyloxyviolanthrone and rubrene.

11. The composition of claim 1 wherein the total fluorescer concentration in the oxalate component and/or in the peroxide component is in the range of 0.002 to 0.03 M.

12. The composition of claim 1 wherein the solvent for the oxalate component comprises dibutylphthalate.

13. The composition of claim 1 wherein the solvent for the peroxide component comprises a mixture of dimethylphthalate and t-butyl alcohol.

* * * * *